United States Patent
Li et al.

(10) Patent No.: US 10,056,849 B2
(45) Date of Patent: Aug. 21, 2018

(54) PIEZOELECTRIC ENERGY HARVESTING SYSTEM WITH FREQUENCY MISMATCH TOLERANCE

(71) Applicant: Analog Devices Global, Hamilton (BM)

(72) Inventors: Xing Li, Hong Kong (CN); Yong Feng, Shanghai (CN); Bin Shao, Andover, MA (US)

(73) Assignee: Analog Devices Global, Hamilton (BM)

( * ) Notice: Subject to any disclaimer, the term of this patent is extended or adjusted under 35 U.S.C. 154(b) by 575 days.

(21) Appl. No.: 14/623,025

(22) Filed: Feb. 16, 2015

(65) Prior Publication Data
US 2016/0204717 A1   Jul. 14, 2016

Related U.S. Application Data

(63) Continuation of application No. PCT/CN2015/070426, filed on Jan. 9, 2015.

(51) Int. Cl.
*H02N 2/18* (2006.01)

(52) U.S. Cl.
CPC .................... *H02N 2/181* (2013.01)

(58) Field of Classification Search
CPC ........ H02N 2/181; H02N 2/186; H02N 2/183; H01L 41/044
USPC ................................................. 310/318, 319
See application file for complete search history.

(56) References Cited

U.S. PATENT DOCUMENTS

| | | | | |
|---|---|---|---|---|
| 6,630,768 B2* | 10/2003 | Yamashiro | ............ | B06B 1/0253 310/316.01 |
| 9,608,548 B2* | 3/2017 | Tabata | .................... | H02N 2/181 |
| 2010/0208501 A1* | 8/2010 | Matan | ....................... | H02J 3/18 363/95 |
| 2011/0227543 A1* | 9/2011 | Ivanov | .................. | H02M 7/219 320/163 |

(Continued)

OTHER PUBLICATIONS

Calhoun, B. H, et al., "Design considerations for ultra-low energy wireless microsensor nodes", IEEE Transactions on Computers, 54(6), (2005), 727-740.

(Continued)

*Primary Examiner* — Bryan Gordon
(74) *Attorney, Agent, or Firm* — Schwegman Lundberg & Woessner, P.A.

(57) ABSTRACT

An impedance matching circuit is provided for use with a piezotransducer that includes a parasitic capacitor comprising: an inductor coupled in parallel with the parasitic capacitor; a peak and valley detection circuit configured to detect output voltage waveform peaks and valleys; a first switch circuit configured to bias flip the output voltage waveform at a selectable first time relative to a detected peak and at a selectable first time relative to a detected valley; a second switch circuit configured to couple the inductor to the energy storage circuit at a selectable second time following each output voltage bias flip; an energy monitoring circuit to provide an indication of energy flow from the inductor to the energy storage circuit following each output voltage bias flip; and a maximum power point tracking (MPPT) circuit configured to select the first time and the second time based at least in part upon the indicated energy flow.

21 Claims, 7 Drawing Sheets

(56) References Cited

U.S. PATENT DOCUMENTS

| | | | | |
|---|---|---|---|---|
| 2012/0119618 | A1* | 5/2012 | Tabata | H02N 2/181 310/319 |
| 2012/0126666 | A1* | 5/2012 | Tabata | H02N 2/181 310/319 |
| 2012/0212101 | A1* | 8/2012 | Tabata | H01L 41/1136 310/319 |
| 2012/0300679 | A1* | 11/2012 | Tsutsumi | H04B 1/18 370/278 |
| 2014/0062389 | A1* | 3/2014 | Ide | H02J 7/0052 320/107 |
| 2014/0159667 | A1* | 6/2014 | Kim | H02J 7/0068 320/128 |
| 2014/0246908 | A1* | 9/2014 | Chew | H02M 3/156 307/24 |

OTHER PUBLICATIONS

Charnegie, David, "Frequency tuning concepts for piezoelectric cantilever beams and plates for energy harvesting", Master's Thesis, University of Pittsburgh, (2007), 161 pgs.

Daoud, A., et al., "Maximum power point tracking techniques for solar water pumping systems", Laboratory of Power Electronics and Solar Energy, Department of Electronics, Faculty of Electrical Engineering, University of Sciences and Technology of Oran, Mohamed Boudiaf B.P. 1505, El M'naouer, Oran, Algeria (reçu le Mar. 20, 2010—accepté le Sep. 25, 2010, 11 pgs.

Hehn, Thorsten, et al., "A Fully Autonomous Integrated Interface Circuit for Piezoelectric Harvesters", IEEE Journal of Solid-State Circuits, vol. 47, No. 9, Sep. 2012, (2012), 2185-2198.

Kong, N., et al., "esistive Impedance Matching Circuit for Piezoelectric Energy Harvesting", Journal of Intelligent Material Systems and Structures, 21(3), (Sep. 2010), 1293-1302.

Lu, C., et al., "Vibration Energy Scavenging System With Maximum Power Tracking for Micropower Applications", IEEE Transactions on Very Large Scale Integration (VLSI) Systems, 19(11), (Nov. 2011), 2109-2119.

Morales, David Sanz, "Maximum Power Point Tracking Algorithms for Photovoltaic Applications", Faculty of Electronics, Communications and Automation Thesis submitted for examination for the degree of Master of Science in Technology. Espoo Dec. 14, 2010, (2010), 82 pgs.

Ramadass, Y. K, et al., "An Efficient Piezoelectric Energy Harvesting Interface Circuit Using a Bias-Flip Rectifier and Shared Inductor", IEEE Journal of Solid-State Circuits, 45(1), (Jan. 2010), 189-204.

Roundy, S., et al., "A study of low level vibrations as a power source for wireless sensor nodes", Computer Communications, 26(11), (Jul. 1, 2003), 1131-1144.

Tsui, Chi-Ying, et al., "Energy Harvesting and Power Delivery for Implantable Medical Devices", Foundations and Trends in Electronic Design Automation, 7(3), (Aug. 15, 2013), 179-246.

Yafaoui, A., et al., "Implementation of Maximum Power Point Tracking Algorithm for Residential Photovoltaic Systems", 2nd Canadian Solar Buildings Conference—Calgary, Jun. 10-14, 2007, (2007), 6 pgs.

Yu, Ting-Chung, et al., "A Study on Maximum Power Point Tracking Algorithms for Photovoltaic Systems", Department of Electrical Engineering Lunghwa University of Science and Technology, (2010), 10 pgs.

Yuk, Young-Sub, et al., "23.5 An energy pile-up resonance circuit extracting maximum 422% energy from piezoelectric material in a dual-source energy-harvesting interface", 2014 IEEE International Solid-State Circuits Conference Digest of Technical Papers (ISSCC), (2014), 402-403.

Zhao, J., et al., "Bias-Flip Technique for Frequency Tuning of Piezo-Electric Energy Harvesting Devices", J. Low Power Electron. Appl., 3(2), (2013), 194-214.

Zhu, D., et al., "Strategies for increasing the operating frequency range of vibration energy harvesters: a review", Measurement Science and Technology, 21(2), (2010), 022001 (29pp).

* cited by examiner

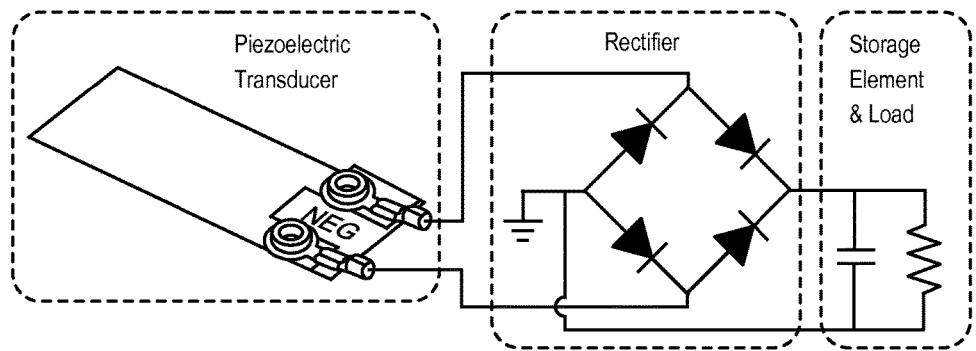
*FIG. 1*
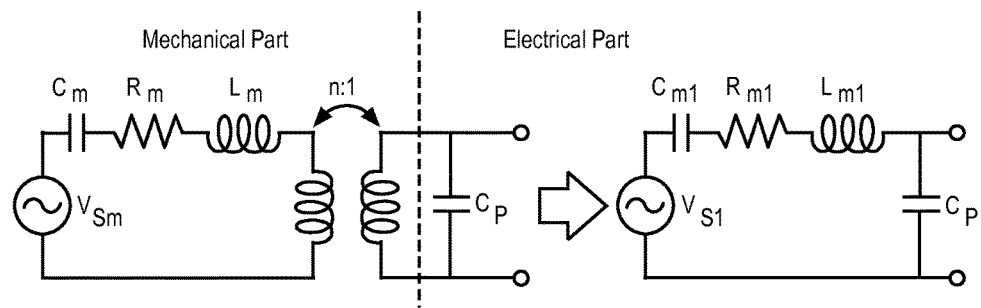
*FIG. 2A*  *FIG. 2B*
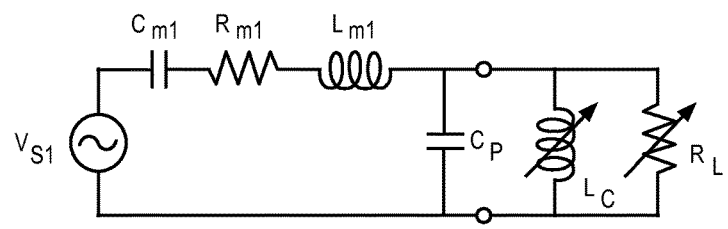
*FIG. 4*

PIEZOELECTRIC ENERGY HARVESTING SYSTEM WITH FREQUENCY MISMATCH TOLERANCE

CLAIM OF PRIORITY

This application is a continuation under 35 U.S.C. § 111(a) and claims benefit of priority to International Patent Application Serial No. PCT/CN2015/070426, filed on Jan. 9, 2015, which is hereby incorporated by reference herein in its entirety.

BACKGROUND

Piezoelectric transducers have been used to harvest mechanical energy for micro-power applications. FIG. 1 is an illustrative drawing showing an example piezoelectric energy harvesting system. A piezoelectric transducer is electrically coupled to a rectifier circuit, which is coupled to an energy storage element and a load that draws energy from the storage element. The piezoelectric transducer converts the vibration mechanical energy into AC electrical energy which is then rectified into DC energy by the rectifier and stored into the storage element to provide a supply voltage for the load circuitry. A maximum power point tracking (MPPT) typically is used in an energy harvesting system to achieve the maximum power from the piezoelectric transducer no matter how the environment changes. MPPT based upon resistive matching has been used in piezoelectric energy harvesting systems. N. Kong et al., "Resistive Impedance Matching Circuit for Piezoelectric Energy Harvesting," *Journal of intelligent material systems and structures*, vol. 21, pp. 1293-1302, September 2010; and C. Lu et al., "Vibration Energy Scavenging System With Maximum Power Tracking for Micropower Applications," *IEEE Trans. Very Large Scale Integr. (VLSI) Syst.*, vol. 19, no. 11, pp. 2109-2119, November 2011. In normal operation, the rectifier's output voltage is controlled to be half of the open voltage of the piezoelectric transducer such that the rectifier's input resistance matches with the internal resistance of the piezoelectric transducer. The rectifier's output is controlled by adjusting the duty ratio of the followed DC-DC. Usually, the piezoelectric transducer has a non-negligible parasitic capacitance that traps major power, and as a result, only minor power flows to the loading. Thus, resistive matching based MPPT typically does not provide optimal power harvesting.

As a consequence, conjugate matching is required to avoid power trapping in the reactance of a piezoelectric transducer. FIG. 2A is an illustrative drawing representing a model of a piezoelectric transducer with cantilever structure. The model includes models of both mechanical and electrical characteristics of the transducer shown separated by a vertical dashed line. On the mechanical side, a mechanical vibration source $V_{Sm}$ imparts mechanical vibration to the transducer. The piezoelectric transducer includes a mechanical inductor Lm and a mechanical capacitor Cm, which represent the equivalent mass and stiffness of the transducer, respectively. The piezoelectric transducer also includes a mechanical resistor Rm, which represents mechanical damping. The transformer represents the coupling between the mechanical domain and the electrical domain. On the electrical side, the piezoelectric transducer has a non-negligible parasitic capacitor $C_P$.

FIG. 2B is an illustrative drawing representing a simplified version of the piezoelectric transducer model of FIG. 2A. During operation of the piezoelectric transducer at resonant frequency, the mechanical reactances Lm and Cm cancel each other out, and Rm and $C_P$ remain. In piezoelectric energy harvesting, if the electrical load (not shown) is purely resistive, then much of the electrical power coupled from the mechanical side will be trapped in the capacitance $C_P$ and then be reflected back into the mechanical domain and dissipated by the Rm. The electrical load may include rectifier circuitry or other circuits, for example. Conjugate matching using an inductor (not shown) has been used to compensate for the parasitic capacitive reactance $C_P$ of the piezoelectric transducer. However, due to typical low frequency operation of the piezoelectric transducer, usually in the range of approximately 10 to 100 Hertz, a physically large inductor was required, which can be impractical in actual applications. See, S. Roundy, P. K. Wright, J. Rabaey, "A study of low level vibrations as a power source for wireless sensor nodes," *Computer Communications*, vol. 26, pp. 1131-1144, 2003.

Bias flipping technique has been used to achieve impedance matching using a small inductance to achieve improved energy harvesting from a piezoelectric transducer. See, Y. K. Ramadass, and A. P. Chandrakasan, "An Efficient Piezoelectric Energy Harvesting Interface Circuit Using a Bias-Flip Rectifier and Shared Inductor," *IEEE Journal of Solid-State Circuits*, vol. 45, no. 1, pp. 189-204, January 2010; Y. S. Yuk, et al., "An Energy Pile-Up Resonance Circuit Extracting Maximum 422% Energy from Piezoelectric Material in a Dual-Source Energy-Harvesting Interface," ISSCC, 2014; and J. Zhao et al., "Bias-Flip Technique for Frequency Tuning of Piezo-Electric Energy Harvesting Devices," *Journal of Low Power Electronics and Applications*, vol. 3, pp. 194-214, April, 2013. FIG. 3A is an illustrative drawing representing a parasitic capacitance portion of a piezoelectric transducer and an impedance matching circuit used to achieve impedance matching through a bias flip technique. A stimulated current source $I_S$ is coupled across the terminals of a parasitic capacitance $C_P$. The current source $I_S$ is stimulated by mechanical vibration of the transducer, which is stimulated by an external vibration source (not shown). A switch controlled inductor L is coupled in parallel to shunt the parasitic capacitance $C_P$. $V_S$ represents a stimulated voltage across the capacitance $C_P$ that is stimulated by the vibration source. A switch circuit alternately opens and closes to controllably decouple and couple the shunt coupling between the inductor L and the capacitance $C_P$.

FIG. 3B is an illustrative drawing showing waveforms representing a bias flip process to achieve impedance matching using the switched inductance in the circuit of FIG. 3A. Waveform $I_S$ represents a stimulated current, having a sinusoidal shape. Waveform $V_S$ represents the stimulated voltage output of the piezoelectric transducer without bias flipping. Stated differently, waveform $V_S$ represents the stimulated voltage output, which if the switch were always open, also would have a sinusoidal shape that is phase shifted by 90 degrees from $I_S$. Waveform SW represents a sequence of switch transitions, from open to close and from close to open. Waveform $V_{Sbp}$ represents a resulting stimulated voltage with bias flip due to alternately opening and closing the switch. Referring to waveform SW, the switch closes at $V_S$ peak, and remains closed for long enough for the inductor and the parasitic capacitance to be resonant so as to achieve bias flip and then opens again. The switch also closes at each $V_S$ valley, and remains closed for long enough for the bias flip to occur and then open again. Thus, bias flipping of the $V_{Sbp}$ waveform occurs at each $V_S$ peak and each $V_S$ valley. It will be appreciated, therefore, that the $V_{Sbp}$ waveform bias flips at one-half cycle intervals. The inductor L is selected to have a small value so that energy resonates between $C_P$ and L at a high frequency. It can be seen that in steady state, the resulting waveform $V_{Sbp}$ is substantially in phase with $I_S$ indicating that impedances L and $C_P$ are matched resulting in cancellation of the reactance $C_P$. Thus, bias flip achieves impedance matching using a smaller more practical switched inductor L, which releases energy that otherwise, would be trapped by parasitic capacitance $C_P$. See, J. Zhao et al., Supra.

SUMMARY

In one aspect, an impedance matching circuit is provided for use with a piezotransducer that can produce an output voltage waveform in response to a mechanical input stimulus and with an energy storage circuit that can harvest energy from the output voltage waveform. The piezotransducer includes a parasitic capacitor. An inductor is coupled in parallel with the parasitic capacitor. A peak and valley detection circuit is configured to detect output voltage waveform peaks and valleys. A first switch circuit is configured to bias flip the output voltage waveform at a selectable first time relative to detected peaks and valleys. A second switch circuit is configured to couple the inductor to the energy storage circuit at a selectable second time following each output voltage bias flip. An energy monitoring circuit includes a voltage detector configured to provide an indication of energy flow from the inductor to the energy storage circuit following each output voltage bias flip. A maximum power point tracking (MPPT) circuit configured to select the first time and the second time based at least in part upon the indicated energy flow.

In another aspect, a method is provided to capture energy from a piezotransducer configured to produce an output voltage waveform in response to a mechanical input stimulus. The piezotransducer includes a parasitic capacitor. The parasitic capacitor is coupled in parallel with an inductor. The output voltage waveform is bias flipped at times leading or lagging the output waveform peaks and at times leading or lagging the output waveform valleys. The inductor is coupled to an energy storage device following each bias flip. An amount of energy captured by energy storage device during each coupling of the inductor to the energy storage device is measured. The leading or lagging times are determined based at least in part upon the amount of energy captured during each coupling of the inductor to the energy storage device.

BRIEF DESCRIPTION OF THE DRAWINGS

FIG. 1 is an illustrative drawing showing an example piezoelectric energy harvesting system.

FIG. 2A is an illustrative drawing representing the equivalent circuit of a piezoelectric transducer with cantilever structure.

FIG. 2B is an illustrative drawing a simplified representation of the equivalent circuit of the piezoelectric transducer of FIG. 2A.

FIG. 4 is an illustrative drawing representing a piezoelectric transducer coupled to an adaptive conjugate impedance matching network, in accordance with some embodiments.

DESCRIPTION OF EMBODIMENTS

Figure 3A:
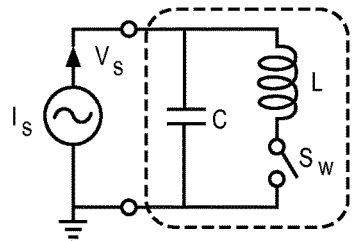
FIG. 3A is an illustrative drawing representing a parasitic capacitance portion of a piezoelectric transducer and an impedance matching circuit used to achieve impedance matching through a bias flip technique.

The following description is presented to enable any person skilled in the art to create and use a piezoelectric energy harvesting system with frequency mismatch tolerance. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A machine such as a controller or processor is configured to perform these processes. The flow diagrams include modules that represent the configuration of a controller to perform the acts described with reference to these modules. Thus, the present invention is not intended to be limited to the embodiments shown, but is to be accorded the widest scope consistent with the principles and features disclosed herein.

FIG. 4 is an illustrative drawing representing a piezoelectric transducer coupled to an adaptive conjugate impedance matching network in accordance with some embodiments. A mechanical vibration source $V_{S1}$ imparts mechanical vibration to the piezoelectric transducer. On the mechanical side, the transducer includes a mechanical inductor $Lm_1$, a mechanical capacitor $Cm_1$ and a mechanical resistor $Rm_1$. On the electrical side, the transducer includes a parasitic capacitor $C_P$. In some applications, the vibration frequency of a resonant source may vary with temperature, moisture or air pressure, for example. In some situations, the resonant frequency of a piezoelectric transducer cannot be readily varied to be the same as the variable vibration frequency of the energy source. As a result of differences between the resonant frequency of the piezoelectric transducer and the vibration source frequency, in some situations, the mechanical reactance $Cm_1$ and $Lm_1$ do not cancel, and $C_P$ alone does not suffice as equivalent impedance. An adaptive impedance matching network is provided, in accordance with some embodiments, to match internal impedance of the piezoelectric transducer. The adaptive impedance matching network is coupled to the transducer and includes an adjustable reactance $L_C$ that is adjusted to match the variable electrical reactance $C_P$ of the piezoelectric transducer. The adaptive impedance matching network also includes an adjustable load $R_L$ that is adjusted to efficiently harvest energy imparted to the transducer by the variable frequency vibration source.

Figure 5A:
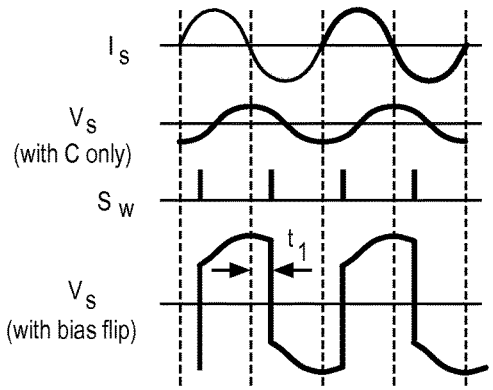
FIG. 5A is an illustrative drawing showing waveforms produced using the circuit of FIG. 3A, which represent an adaptive phase delay bias flip process, in accordance with some embodiments.

FIG. 5A is an illustrative drawing of waveforms produced using the circuit of FIG. 3A, which represent an adaptive phase delay bias flip process in accordance with some embodiments. Waveform $I_S$ represents a stimulated current, having a sinusoidal shape. Waveform $V_S$ in FIG. 5A represents a hypothetical stimulated voltage that would exist if the switch was always open (i.e. in the absence of bias flipping) and the transducer operated at resonant frequency in which case, $I_S$ would be shifted by 90 degrees relative to $V_S$. In actual fact, if an external vibration source vibrates at a frequency different from the transducer resonant frequency, then a phase relationship between $I_S$ and an actual $V_S$ waveform (not shown) will be different from 90 degrees due to mismatching of mechanical reactances, Cm1 and Lm1. Waveform SW1 represents a sequence of switch transitions at $I_S$ zero crossings. More specifically, FIG. 5A shows a delayed bias flip waveform $V_{Sdbp}$, which represents a stimulated voltage waveform resulting from the transitioning of the switching state of the switch at a delay time of $t_1$ after each successive $I_S$ zero crossing, causing a bias flip delayed by the delay time interval $t_1$ after each $I_S$ zero crossing. Closing the switch couples the inductor shunt $L_C$ to the capacitor $C_P$, so that L can be resonant with the $C_P$. The switch remains closed for long enough for the bias flip to occur and then opens again. It will be appreciated that each $I_S$ zero crossing corresponds to a peak or valley of the hypothetical $V_S$ waveform of FIG. 5A. The inductor $L_C$ is selected to have a small value so that energy resonates between $C_P$ and $L_C$ at a high frequency during successive bias flipped one-half cycle intervals. Transitioning of the switch to a first, closed, switching state at a delay time of $t_1$ after each $I_S$ zero crossing for a time interval long enough to cause a bias flip, before transitioning the switch back to a second, open, switching state, results not only in reversing, i.e. flipping, the voltage $V_{Sdbp}$ every half-cycle, but also in phase shifting of the flipped bias $V_{Sdbp}$ relative to $V_S$ by a phase delay that corresponds to time $t_1$ so that in steady state, $V_{Sdbp}$ has a $t_1$ time phase delay relative to $I_S$. It will be appreciated that the phase delay imparted to $V_{Sdbp}$ results in the circuit within the dashed lines simulating the behavior of a capacitance shunted with a resistance.

Figure 5B:
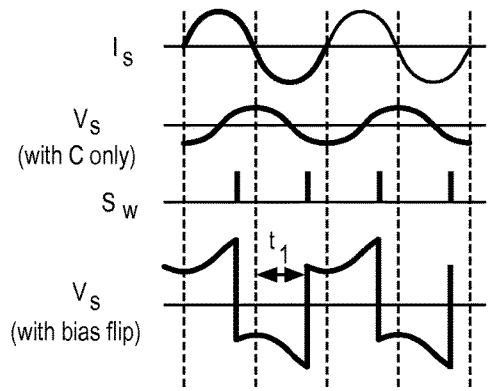
FIG. 5B is an illustrative drawing showing waveforms produced using the circuit of FIG. 3A, which represent an adaptive phase lead bias flip process, in accordance with some embodiments.

FIG. 5B is an illustrative drawing of waveforms produced using the circuit of FIG. 3A, which represents an adaptive phase lead bias flip process in accordance with some embodiments. When the delay $t_1$ is greater than one-quarter of a cycle of the waveform, then the delay $t_1$ may be referred to as a "lead". Waveform $I_S$ represents a stimulated current, having a sinusoidal shape. Waveform $V_S$ in FIG. 5B represents a hypothetical stimulated voltage that would exist if the switch was always open (i.e. in the absence of bias flipping) and the transducer operated at resonant frequency in which case, $I_S$ would be shifted by 90 degrees relative to $V_S$. As explained above with reference to FIG. 5A, in actual fact, if an external vibration source vibrates at a frequency different from the transducer resonant frequency, then a phase relationship between $I_S$ and an actual $V_S$ waveform (not shown) will be different from 90 degrees due to mismatching of mechanical reactances, Cm1 and Lm1. Waveform SW1 represents a sequence of switch transitions at $I_S$ zero crossings. More particularly, waveform $V_{Sdbp}$ in FIG. 5B represents a stimulated voltage waveform resulting from transitioning of switching state of the switch at a lead time $t_1$ before each successive $I_S$ zero crossing, causing a bias flip that leads $I_S$ crossings by a lead time interval $t_1$ before each $I_S$ zero crossing. Closing the switch couples the inductor shunt $L_C$ from the capacitor $C_P$. The switch remains closed for long enough for the bias flip to occur and then opens again. It will be appreciated that each $I_S$ zero crossing corresponds to a peak or valley of the hypothetical $V_S$ waveform in FIG. 5B. The inductor $L_C$ is selected to have a small value so that energy resonates between $C_P$ and $L_C$ at a high frequency during successive bias flipped one-half cycle intervals. The transitioning of the switch to a first, closed, switching state at a lead time of $t_1$ before each $I_S$ zero crossing for a time interval long enough to cause a bias flip, before transitioning the switch back to a second, open, switching state, results not only in reversing, i.e. flipping, the voltage $V_{Slbp}$ every half cycle, but also in phase shifting of $V_{Slbp}$ so that $V_{Slbp}$ has a time $t_1$ phase lead relative to $I_S$. It will be appreciated that the phase lead imparted to $V_{Slbp}$ results in the circuit within the dashed lines simulating the behavior of an inductance shunted with a resistance.

The phase delay bias flip described with reference to FIG. 5A and phase lead bias flip described with reference to FIG. 5B can be used interchangeably, depending upon the phase offset between $I_S$ and an actual $V_S$ (not shown), to achieve impedance matching despite variation in vibration source frequency. Thus, in accordance with some embodiments, the time $t_1$ in FIGS. 5A-5B is an adaptive value that depends upon the phase difference between $I_S$ and an actual stimulated waveform (not shown). As explained more fully below, an MPPT process is used to determine an adaptive value of $t_1$, whether delay time or lead time, whichever is the case, to achieve impedance matching.

Figure 6A:
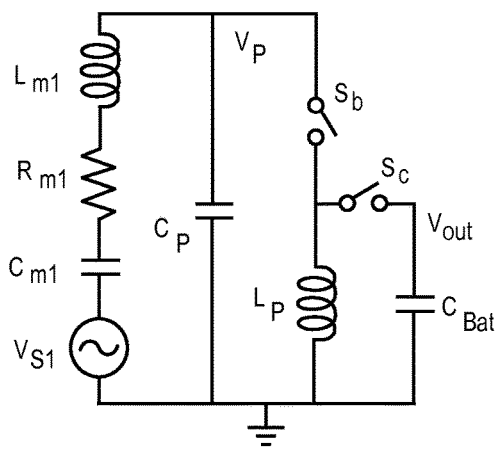
FIG. 6A is an illustrative architecture level drawing representing a piezoelectric transducer coupled to an adaptive impedance matching network and a battery in which harvested energy is stored, in accordance with some embodiments.

FIG. 6A is an illustrative architecture level drawing representing a piezoelectric transducer coupled to an adaptive impedance matching network and a battery in which harvested energy is stored, in accordance with some embodiments. Mechanical components of the transducer are represented by Lm1, Rm1 and Cm1 and electrical characteristics of the transducer are represented by $C_P$ as explained above with reference to FIG. 4. The adaptive impedance matching network is represented by inductor $L_P$ and switches $S_b$ and $S_c$. Energy from external excitation source $V_{S1}$ is harvested using the transducer for storage in a battery $C_{Bat}$.

Figure 6B:
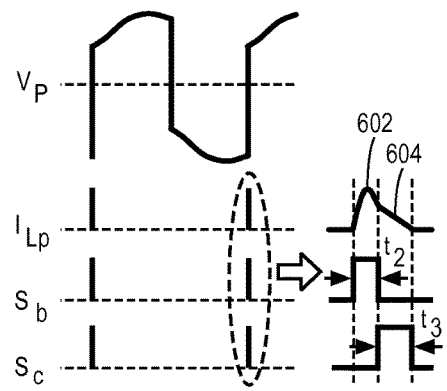
FIG. 6B is an illustrative drawing showing waveforms representing bias flip and battery charging process in accordance with some embodiments.

FIG. 6B is an illustrative drawing showing waveforms representing bias flip and battery charging process in accordance with some embodiments. Waveform $V_P$ represents a bias flipped voltage across capacitance $C_P$. Waveform $I_{LP}$ represents current flow conducted through the inductor $I_L$. Waveform Sb represents a control signal having time duration $t_2$ used to close switch $S_b$ so as to permit flow of resonant current between $L_P$ and $C_P$. Waveform $S_c$ represents a control signal having a time duration $t_3$ used to close switch $S_c$ so as to permit a charging current to flow from $L_P$ to $C_{Bat}$.

Figure 7:
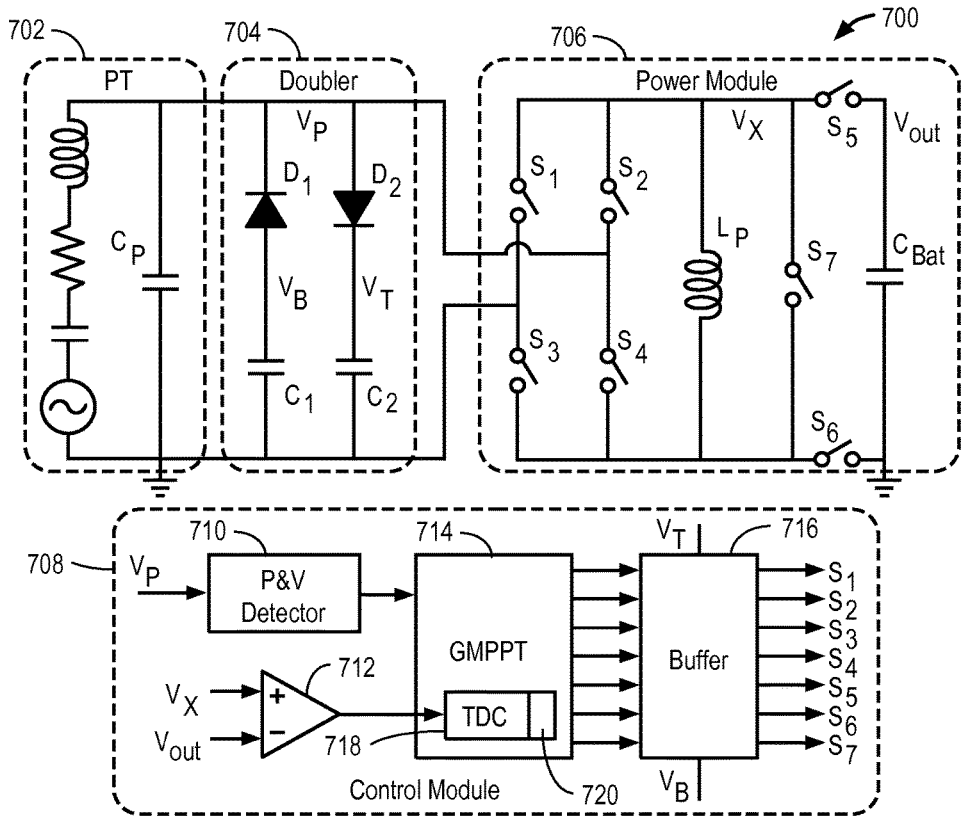
FIG. 7 is an illustrative drawing representing a piezoelectric energy harvesting system in accordance with some embodiments.

At times between $I_S$ zero crossings, switches $S_b$ and $S_c$ are open. As will be understood from the explanation of FIGS. 5A-5B, at an adaptive time $t_1$, switch $S_b$ is closed for long enough to cause bias flipping of voltage $V_P$ and then once again opens. Switch $S_b$ remains closed for a time interval $t_2$. Referring to the portion of curve $I_{LP}$ labeled 602 within time interval $t_2$, upon closure of switch $S_b$, the voltage $V_P$ rapidly reaches its maximum magnitude at the flipped-to polarity (whether positive or negative). Still referring to waveform $I_{LP}$, once $V_P$ reaches its maximum magnitude at the flipped-to polarity, a resonant current begins to flow resulting in decreasing $V_P$ voltage magnitude. At the end of the time interval $t_2$, before $V_P$ has decreased significantly in magnitude, $S_c$ is closed, coupling $L_P$ with the capacitance battery $C_{Bat}$. Switch $S_c$ remains closed for a time interval $t_3$. With switch $S_c$ closed, $L_P$ current flows to the capacitive battery. The time interval $t_3$ is selected to be long enough for $I_{LP}$ to substantially reach zero. During the charging time interval $t_3$, the voltage of $C_{Bat}$ has a substantially constant value $V_{out}$. As a result, the slope of the $I_{LP}$ waveform interval during the time $t_3$ has a substantially constant value $(V_{out}/L_P)$. Thus, as represented by the portion of curve $I_{LP}$ labeled 604 within time interval $t_3$, the rate of current flow decreases substantially linearly with time. Thus, $t_3$ is an indication of the time required to discharge the $I_{LP}$ current to zero. Switch $S_b$ is opened following time interval $t_2$. It will be appreciated that the duration of time interval $t_2$ is analogous to determining size of a damping resistance $R_L$. A shorter time interval $t_2$, results in more energy flow during time interval $t_3$ and a larger the effective damping resistance. A longer time interval $t_2$, results in less energy flow during time interval $t_3$ and a smaller effective damping resistance. It will be appreciated that time intervals $t_2$ and $t_3$ are shorter than one-half cycle of $V_P$, and therefore, occur in between bias flips of $V_P$. In practice, the duration of $t_3$ is several tens of microseconds, and the duration of $t_2$ is at least long enough to achieve bias flip, FIG. 7 is an illustrative drawing representing a piezoelectric energy harvesting system 700 in accordance with some embodiments. The system 700 includes a piezoelectric transducer 702, a voltage doubler circuit 704, a power module 706 and control module 708. The transducer 702 is described above. The doubler 704 includes series connected diode D1 and capacitor C1 coupled in parallel as shown with series connected and diode D2 and capacitor C2. The voltage doubler 704 acts as a rectifier circuit. More specifically, the voltage doubler receives as input an AC voltage output produced by the transducer 702. The voltage doubler 704 outputs a DC voltage having double the voltage of the received AC input voltage. In some embodiments, voltage produced by the doubler 704 is used to power the control module 708 and to drive switches of the power module 706.

The power module 706 includes inductor $L_P$, which is a small inductor used both for bias flipping and battery charging. In accordance with some embodiments, the inductor $L_P$ has a value in a range of several tens to several hundreds of micro henry. The actual inductor value depends upon the particular application. The power module includes switches S1-S4 used both for rectification and also to control the bias flipping. The power module 706 includes switches S5-S6 used for charging a capacitor battery $C_{Bat}$. The power module 706 includes switch S7 used as a freewheel switch to remove remaining energy on $L_P$ to avoid unwanted oscillation.

The control module 708 includes a peak and valley detector (PV detector) 710, a voltage detector circuit 712, a global maximum power point tracking (GMPPT) processing block 714 and a buffer 716 used to store switch control signal values. The PV detector 710 receives as input a value $V_P$, which represents the voltage of the parasitic capacitor Cp. In accordance with some embodiments, the PV detector 710 detects $V_P$ peaks and $V_P$ valleys. The voltage detector circuit 712 is coupled to compare voltages on opposite nodes of switch S5 to determine, during battery charging time intervals $t_3$, when the current on inductor $L_P$ has substantially reached zero. The PV detector 710 provides capacitor voltage peak and capacitor voltage valley information to the GMPTT processing block 714 for use as a reference time to determine (delay/lead) timing $t_1$ and also to determine the time intervals $t_2$ during which switches S1-S4 are closed. As explained above, the time $t_1$ is used to tune reactance to impedance match $C_P$ despite variations in an external vibration source frequency. Time interval $t_2$ is tuned to determine a load resistance. The voltage detector circuit 712 provides timing information to a time-to-digital converter (TDC) 718, which includes a counter 720 used to advance a count to determine duration of a monitored time interval $t_3$. The GMPPT processing block 714 produces switch control signals SC1-SC7 as output to control switches S1-S7, respectively.

Figure 8:
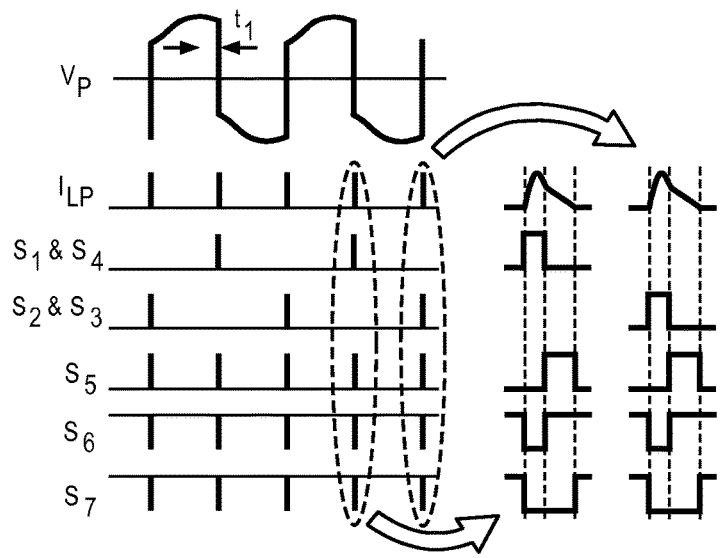
FIG. 8 is an illustrative drawing showing waveforms representing operation of the system of FIG. 7 in accordance with some embodiments.

FIG. 8 is an illustrative drawing showing waveforms representing operation of the system of FIG. 7 in accordance with some embodiments. During a rising portion of a peak cycle of the $V_P$ waveform, switches S1 and S4 are opened (turned off), decoupling the inductor $L_P$ from parallel from the parasitic capacitor $C_P$. While S1 and S4 are closed, rectified current can flow through a first circuit path, which includes diode D1. The reactance effect of D1 and C1 generally can be ignored since C1 typically is much smaller than $C_P$. In response to $V_P$ peak detection, at a selectable first time delay $t_1$ after the detected $V_P$ peak, switches S1 and S4 are closed (turned on) to couple the inductor from a parallel connection with the parasitic capacitor $C_P$, so as to cause bias flipping of the $V_P$ waveform. Also, switches S6 and S7 are opened (turned off) to avoid shorting. Switches S1 and S4 remain closed for time interval $t_2$ for the bias flip to occur and then open again, decoupling the inductor $L_P$ in parallel with $C_P$. After time interval $t_2$, switches S1 and S4 are opened, switches S5 and S6 are closed (turned on). Closing switch S5 couples the inductor $L_P$ in a third circuit path on which inductor current $I_{LP}$ can flow for a monitored time interval $t_3$ during which energy, in the form of current flow through $L_P$ is charged to the battery $C_{Bat}$. In response to a determination that charging current $I_{LP}$ has crossed zero, switch S5 is opened (turned off) so as to decouple the inductor from the third circuit path and from the battery. However, switch S6 remains closed to give $L_P$ a DC bias, such as ground, so that the voltage of $L_P$ does not float, which could result in leakage current. Switch S7 is closed (turned on) to dissipate remaining energy in $L_P$ to avoid its oscillation.

During a rising portion of a valley cycle of the $V_P$ waveform, switches S2 and S3 are opened (turned off), decoupling the inductor $L_P$ in parallel with the parasitic capacitor $C_P$. While S2 and S3 are closed, rectified current can flow through a second circuit path, which includes diode D2. The reactance effect of D2 and C2 generally can be ignored since C2 typically is much smaller than $C_P$. In response to $V_P$ valley detection, at the selectable first time delay $t_1$ after the detected $V_P$ valley, switches S2 and S3 are closed (turned on) to couple the inductor from parallel connection with the parasitic capacitor $C_P$, so as to cause bias flipping of the $V_P$ waveform. Also, switches S6 and S7 are opened (turned off) to avoid shorting. Switches S2 and S3 remain closed for time interval $t_2$ for the bias flip to occur and then open again, decoupling the inductor $L_P$ in parallel with $C_P$. After time interval $t_2$, switches S2 and S3 are opened, switches S5 and S6 are closed (turned on). Closing switch S5 couples the inductor $L_P$ in the third circuit path on which inductor current $I_{LP}$ can flow for a monitored time interval $t_3$ during which energy, in the form of current flow through $L_P$ is charged to the battery $C_{Bat}$. In response to a determination that charging current $I_{LP}$ has crossed zero, switch S5 is opened (turned off) so as to decouple the inductor from the third circuit path and from the battery. Switch S6 remains closed to give $L_P$ a DC bias, such as ground, so that the voltage of $L_P$ does not float, which could result in leakage current. Switch S7 is closed (turned on) to dissipate remaining energy in $L_P$ to avoid its oscillation. In accordance with some embodiments, the times $t_1$, $t_2$ and $t_3$ are non-overlapped and all controlled by counter in digital domain, so they can share one counter to save hardware resources.

It will be understood that S1 and S4 are used to achieve bias flip during $t_2$ time when delay $t_1$ time after $V_P$ peaks and that S2 and S3 are used to achieve bias flip during $t_2$ time when delay $t_1$ time after $V_P$ valleys. To distinguish these two sets of switches, S1 and S4 also are referred to as first sub-switch circuits, and S2 and S3 also are referred to as second sub-circuits.

Figure 9A:
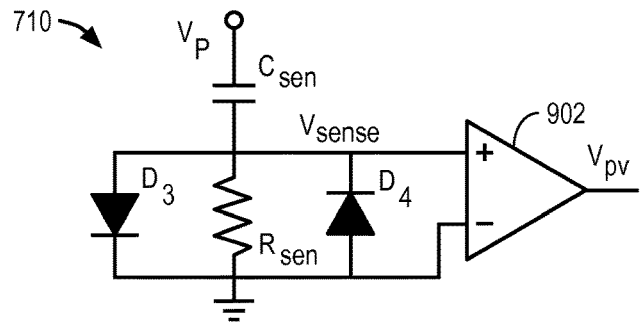
FIG. 9A is an illustrative circuit diagram representing certain details of the PV detector of FIG. 7 in accordance with some embodiments.

FIG. 9A is an illustrative circuit diagram representing certain details of the PV detector 710 of FIG. 7 in accordance with some embodiments. The PV detector 710 is used to detect the peaks and valleys of the stimulated output voltage $V_P$ for use as reference time points in determining occurrence selectable times $t_1$ and $t_2$ relative to $V_P$ peaks and $V_P$ valleys during an MPPT process. The PV detector 710 includes a differentiator circuit that includes a second comparator circuit 902 having a plus (+) terminal coupled to a first terminal of a sense resistor $R_{sen}$ and having a minus (−) terminal coupled to a second terminal of the sense resistor $R_{sen}$. The resistor $R_{sen}$ is coupled in series with a sense capacitor $C_{sen}$. The capacitor $C_{sen}$ has a first terminal coupled to the first terminal of $R_{sen}$ and has a second terminal coupled to receive $V_P$. Diodes D3 and D4 are shunted with $R_{sen}$. The anode and cathode of D3 are coupled to the first and second terminals of $R_{sen}$, respectively. The anode and cathode of D4 are coupled to the second and first terminals of $R_{sen}$, respectively. Thus, the diodes D3 and D4 are coupled to provide in oppisite current paths parallel to the resistor $R_{sen}$. A sensed voltage value $V_{sense}$ is produced at the second comparator plus (+) terminal. The second comparator 902 produces an output $V_{PV}$ waveform.

Figure 9B:
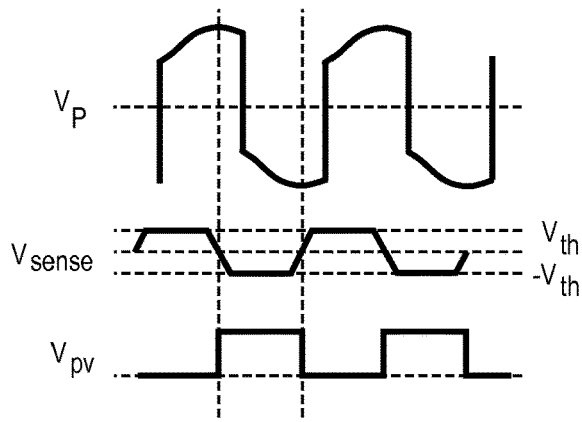
FIG. 9B is an illustrative drawing representing a bias flip $V_P$ waveform, a $V_{sense}$ waveform and a $V_{PV}$ waveform during operation of the VP detector of FIG. 9A with phase delay, in accordance with some embodiments.

FIG. 9B is an illustrative drawing representing a bias flip $V_P$ waveform, a $V_{sense}$ waveform and a $V_{PV}$ waveform during operation of the $V_P$ detector 710 of FIG. 9A with phase delay in accordance with some embodiments. The diodes D3, D4, which have a threshold voltage of $V_{th}$, clamp $V_{sense}$ within a voltage range [−Vth, Vth]. The zero crossings of the $V_{sense}$ waveform correspond to peaks and valleys of the bias flipped $V_P$ waveform. It will be appreciated, of course, that the rate of change in voltage $V_P$ is zero at the $V_P$ peaks and $V_P$ valleys. The differentiator circuit detects these zero rate of change peaks and valleys. More specifically, the $V_{PV}$ waveform comprises a series of pulses. In accordance with some embodiments, each $V_{PV}$ pulse has a delayed (rising) edge that corresponds in time with a $V_P$ peak and a trailing (falling) edge that corresponds in time with a $V_P$ valley. It will be appreciated that the diodes D3, D4 not only provide voltage protection for the followed second comparator 902, but also significantly reduce power consumption due to reduced current flow through $R_{sen}$.

Figure 9C:
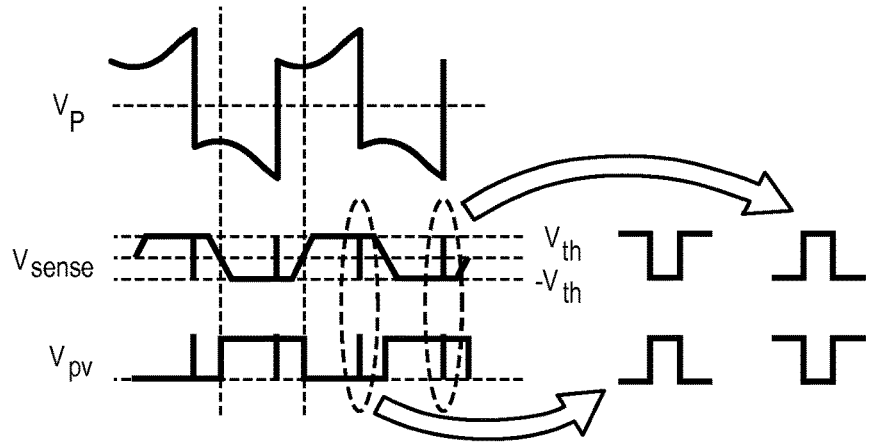
FIG. 9C is an illustrative drawing representing a bias flip $V_P$ waveform, a $V_{sense}$ waveform and a $V_{PV}$ waveform during operation of the VP detector of FIG. 9A with phase lead, in accordance with some embodiments.

FIG. 9C is an illustrative drawing representing a bias flip $V_P$ waveform, a $V_{sense}$ waveform and a $V_{PV}$ waveform during operation of the VP detector of FIG. 9A with phase lead, in accordance with some embodiments. The operation of the VP detector during phase lead is similar to its operation during phase delay. However, some glitches may occur in the $V_{sense}$ and $V_{PV}$ waveforms due to the bias flipping, which can result in a spike in $V_{sense}$ through the differentiator circuit. The diodes D3, D4 act to protect the second comparator from damage due to such glitches. These glitches are removed in the digital domain. For example, a digital filter (not shown) can be used to set a blanking time interval, such as 300 micro seconds, during which a pulse is regarded as a glitch.

Figure 3B:
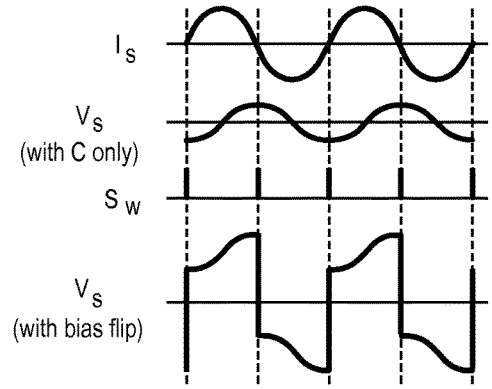
FIG. 3B is an illustrative drawing showing waveforms representing a bias flip process to achieve impedance matching using the switched inductance in the circuit of FIG. 3A.
Figure 10:
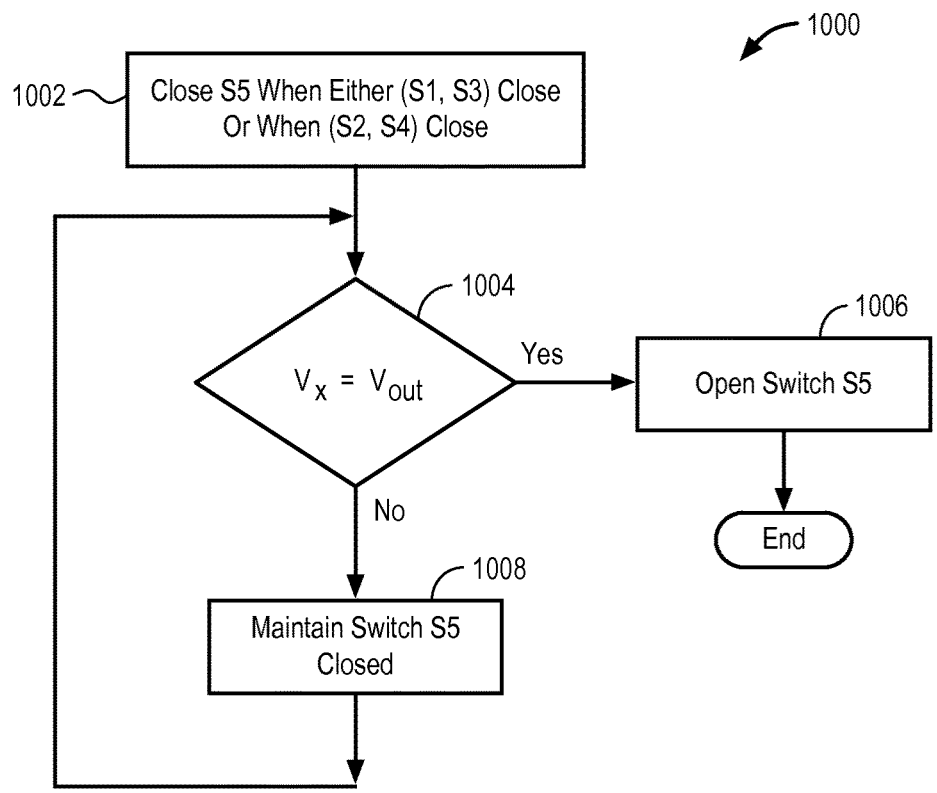
FIG. 10 is an illustrative flow diagram representing a switch control process performed using the switch control comparator of the harvesting system of FIG. 7 in accordance with some embodiments.

FIG. 10 is an illustrative flow diagram 1000 representing a switch control process performed using the voltage detector circuit 712 of the harvesting system 700 of FIG. 7 in accordance with some embodiments. The switch control process 1000 controls the opening and closing of switch S5. The voltage detector circuit 712 includes a comparator controlled switch transistor (not shown), which also acts as an active diode, in accordance with some embodiments. The role of the voltage detector circuit 712 is to monitor the zero current crossing through closed switch S5. When the current through S5 reduces substantially to zero, then switch S5 is opened, decoupling $L_P$ from the battery. In operation, the voltage detector circuit 712 senses the moment when current flow across closed switch S5 reaches zero. In accordance with some embodiments, the voltage detector circuit 712 has inputs coupled across terminals of the closed switch S5. The voltage detector circuit 712 compares the voltage Vx and Vout which are voltages of the two terminals of S5. Current flows from $L_P$ to the battery while Vx>Vout. The voltage detector circuit 712 senses the moment at which the current across the closed switch S5 reduces to or below zero, i.e. when Vx<Vout. The diode component (not shown) of the switch control comparator 712 is configured to permit charge flow from $L_P$ to $C_{Bat}$ and to prevent charge flow from $C_{Bat}$ to $L_P$. In accordance with some embodiments, the voltage detector circuit 712 produces an output signal, such as a falling edge, that indicates when Vx<Vout, and as a result, current across the closed switch S5 falls to substantially zero or below. In accordance with some embodiments, the voltage detector circuit is implemented using a switch control comparator disclosed in Hehn, et al., "A Fully Autonomous Integrated Interface Circuit for Piezoelectric Harvesters", *IEEE Journal of Solid-State Circuits*, Vol. 47, No. 9, September 2012, at page, FIG. 3, which is expressly incorporated herein by this reference.

Referring to FIG. 7 and FIG. 10, in operation, module 1002 starts monitoring of the voltage Vx when switch S5 closes. During each peak cycle of $V_P$, switch S5 closes after the selectable second time interval following a bias flip involving switches S1 and S4. During each valley cycle of $V_P$, switch S5 closes following a bias flip involving switches S2 and S3. It will be appreciated that provided that Vx>$V_{out}$, current $I_{LP}$ flows from the inductor $L_P$ to the battery $C_{Bat}$. Moreover, it will be understood that as energy stored in the inductor $L_P$ is dissipated through charging the battery, both Vx and the battery charging current $I_{LP}$ decrease. Decision module 1004 monitors voltage difference between $V_{out}$ at a terminal of battery $C_{Bat}$ and $V_X$ at a terminal of the inductor $L_P$. In response to a determination that $V_{out}$ is equal to $V_X$, module 1006 opens switch S5 so that charge cannot flow from the battery $C_{Bat}$ to the inductor $L_P$. In response to a determination that $V_{out}$ is not yet equal to Vx, module 1008 maintains switch S5 closed so that charge can continue to flow from the inductor $L_P$ to the battery $C_{Bat}$ so as to charge the battery.

Figure 11:
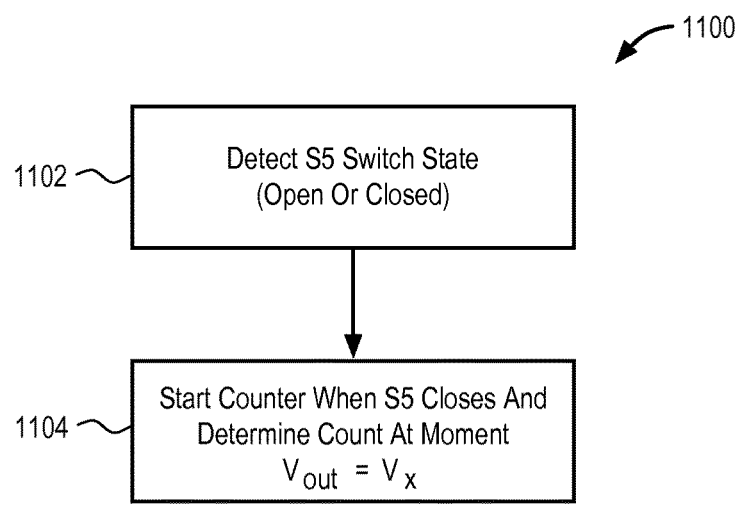
FIG. 11 is an illustrative flow diagram representing a time-to-digital conversion (TDC) process used to determine the amount of time during which charge flows from the inductor to the battery of the harvesting system of FIG. 7 in accordance with some embodiments.

FIG. 11 is an illustrative flow diagram representing a time-to-digital conversion (TDC) process 1100 used to determine the amount of time during which charge flows from inductor $L_P$ to the battery $C_{Bat}$ in accordance with some embodiments. The TDC module 718 includes logic circuitry that is configured to perform the TDC process. The TDC module 718 continually monitors the switch state of switch S5, which as explained above, is controlled by the voltage detector circuit 712. More specifically, a switch state detector module 1102 detects the moment when switch S5 opens such that current cannot flow to charge the battery and the moment when switch S5 closes such that current can flow to charge the battery. In response to module 1102 detecting that S5 is closed so that current can flow, module 1104 starts a count. Module 1104 advances the count at a prescribed clock rate. Module 1104 continues to advance the count at the clock rate while switch S5 is closed. In response to module 1102 detecting that S5 is open, module 1104 reports the count that coincides with the moment when switch S5 opened, which is indicative of time $t_3$. As explained above, the voltage detector circuit 712 opens switch S5, stopping the flow of current to the battery when Vout substantially equals Vx, Module 1104 resets the count and control flows back to decision module 1102.

It will be appreciated that the rate of electrical charge flow from the inductor $L_P$ to the battery $C_{Bat}$ is substantially constant regardless of values selected for $t_1$ and $t_2$. Moreover, a fixed prescribed clock rate is used by the TDC counter that counts while switch S5 is closed and charge flows. Thus, the TDC count reached during the duration of closure of switch S5 is indicative of the amount of charge that flows from $L_P$ to $C_{Bat}$ while S5 is closed. More specifically, since S5 closes in response to $V_{out}$ not being equal to Vx and opens again in response to $V_{out}$ becoming equal to Vx, the duration of the count, i.e. $t_3$, is indicative of the amount of charge transfer from $L_P$ to $C_{Bat}$, and therefore, is indicative of the amount of energy transfer for a particular combination of $t_1$ and $t_2$.

Figure 12:
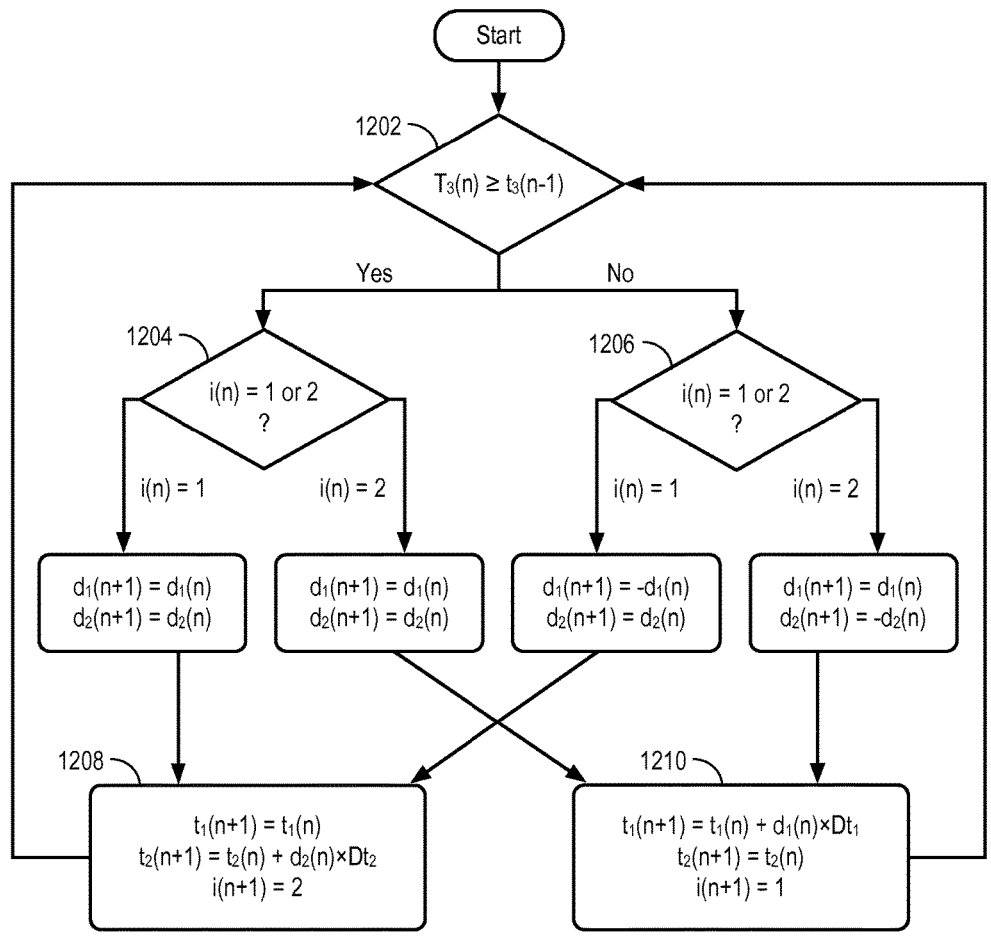
FIG. 12 is an illustrative state diagram representing a state machine implemented using the GMPPT processing block of the system of FIG. 7 in accordance with some embodiments.

The GMPPT processing block 714 includes a processor device or a controller device configured to implement a state machine. FIG. 12 is an illustrative state diagram representing a state machine to implemented using the GMPPT processing block 714 in accordance with some embodiments. Varying the delay time interval $t_1$ varies the equivalent reactive impedance, and that varying the time interval $t_2$ varies the equivalent resistance of load. The $t_3$ time is determined by $t_1$ and $t_2$. The goal is get the longest $t_3$ through adjustment of $t_1$ and $t_2$. More particularly, in accordance with some embodiments, the GMPPT processing block 714 is configured to use a "two dimensional hill climbing" technique that compares the duration $t_3$ for different combinations of $t_1$ and $t_2$ to identify the combination of $t_1$ and $t_2$ that results in maximum energy harvesting. The larger the value of $t_3$, the larger the amount of energy harvested. Thus, the GMPPT processing block 714 is configured to determine the combinations of $t_1$ and $t_2$ that results in the largest value for $t_3$.

More specifically, in accordance with some embodiments, $t_1$ and $t_2$ are adjusted alternately instead of simultaneously. The reference numeral i indicates which variable has been adjusted currently. If i is 1, that means $t_1$ has been adjusted. Next cycle, $t_2$ will be adjusted. If i is 2, that means $t_2$ has been adjusted. Next cycle, $t_1$ will be adjusted. The symbols d1 and d2 indicate the adjustment direction of $t_1$ and $t_2$, respectively. If d1 (d2) is +1, that means $t_1$ ($t_2$) should be increased by one small step $\Delta t_1$ ($\Delta t_2$). If d1 (d2) is −1, that means $t_1$ ($t_2$) should be decreased by $\Delta t_1$ ($\Delta t_2$). At state 1202, current time interval $t_3$, $t_3$ (n), is compared with the previous one $t_3$ (n−1). If $t_3$ (n) is larger than or equal to $t_3$ (n−1), then at state 1204, d1 and d2 will hold the previous value. There is no need to change the adjustment direction. d1(n+1) and d2(n+1) are assigned by d1(n) and d2(n), respectively. If $t_3$ (n) is smaller than $t_3$ (n−1), then at state 1206, d1 or d2 is changed according to i(n). If i(n) is 1, d1(n+1) is changed to −d1(n). If i(n) is 2, d2(n+1) is changed to −d2(n). If i(n) is 1, no matter $t_3$ (n)≥$t_3$ (n−1) is true or not, then in a next state 1208, $t_2$ (n+1) will be added by d2(n)×$\Delta t_2$ and i(n+1) will be changed to 2. Similarly, if i(n) is 2, then in a next state 1210, $t_1$ (n+1) will be added by d1(n)×$\Delta t_1$ and i(n+1) will be changed to 1. After $t_1$ or $t_2$ is adjusted, there is a wait for several time cycles until the system settles. Then $t_3$(n+1) is obtained and control flows again to state 1202 for next comparison.

Figure 13:
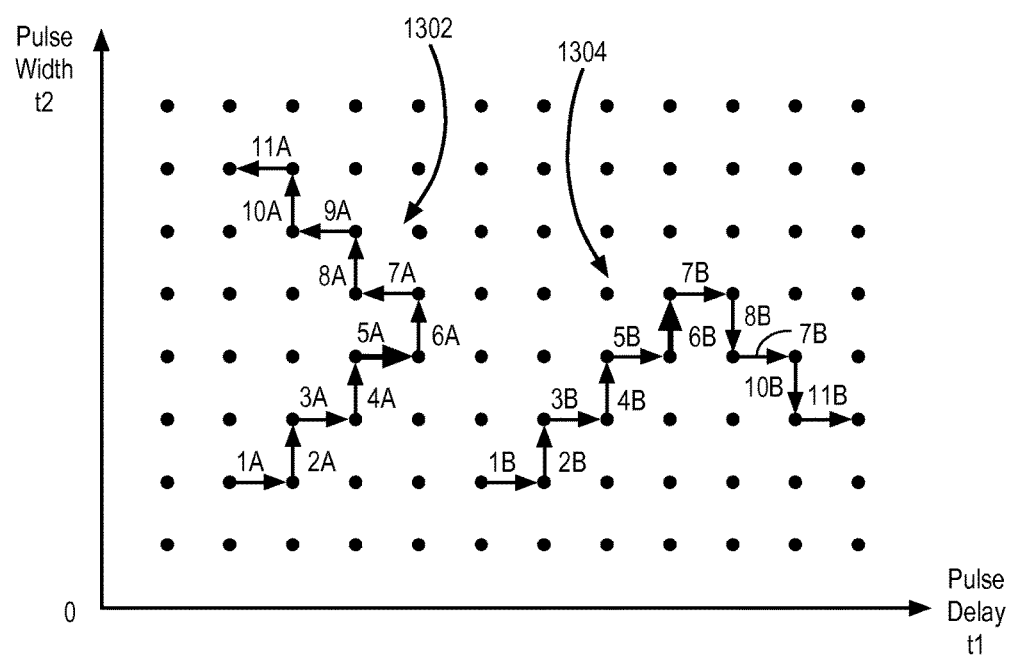
FIG. 13 is an illustrative drawing providing charts of two example runs of a two dimensional hill climbing process implemented using the GMPPT processing block of FIG. 12 in accordance with some embodiments.

FIG. 13 is an illustrative drawing providing charts of two example runs of a two dimensional hill climbing process implemented using the GMPPT processing block 714 in accordance with some embodiments. The goal of the two dimension hill climbing is to determine the combination of a phase delay time parameter $t_1$ and a bias flipping pulse width parameter $t_2$ that result in the largest value $t_3$, which corresponds to the largest output power possible. The larger $t_3$, the more output power, i.e. the more energy harvested. The two parameters $t_1$ and $t_2$ are adjusted alternately.

Referring to the example on the left labeled 1302, a first segment 1A represents an increase in the phase-delay $t_1$, followed by a determination that $t_3$ increases. The increased output power following the increased phase delay $t_1$ indicates that increasing the phase delay $t_1$ is the correct direction for phase delay since it results in an output power increase. As a result, the phase delay will be changed in the same direction (i.e. increased) on the next $t_1$ change cycle. A second segment 2A represents an increase in the pulse-width $t_2$, followed by a determination that $t_3$ increases, indicating an increase in the output power. The increased output power following the increased pulse-width $t_2$ indicates that increasing pulse width is the correct change direction for pulse-width since it results in an output power increase. As a result, the pulse-width $t_2$ will be changed in the same direction (i.e. increased) on the next $t_2$ change cycle. The third segment 3A represents another increase in phase delay $t_1$ resulting in another increase in $t_3$. The fourth segment 4A represents another increase in pulse-width $t_2$ resulting another increase in $t_3$. However, the fifth segment 5A represents another increase in phase delay $t_1$, but this time resulting in a decrease in $t_3$. As a result, the direction of phase delay change will be reversed during a next phase delay change cycle. The sixth segment 6A represents another increase in pulse-width $t_2$ resulting in another increase in $t_3$. The seventh segment 7A represents a change of the phase delay $t_1$ to a decreased value, since the previous phase change in segment 5A resulted in a reduced $t_3$. In this example, the output power $t_3$ continues to increase for the next four segments 8A-11A. Thus, the next two phase delay change segments 9A and 11A continue to reduce the phase change value $t_1$, and the next two pulse width change segments 8A and 10A continue to increase the pulse-width value.

Referring to the example on the right labeled 1304, during each of segments 1B, 3B, 5B, 7B, 9B and 11B, the value of $t_3$ increases, and therefore, during each of these segments, the phase delay $t_1$ is increased. During segments 2B and 4B, the pulse width $t_2$ is increased resulting in increased $t_3$. However, in segment 6B, the pulse width $t_2$ is increased resulting in decreased $t_3$. As a result, in segment 8B, the pulse width change direction is changed to a decrease, which results in increased $t_3$. Segment 10B represents another decrease in pulse width $t_2$ that results in increased $t_3$.

It will be appreciated that for simplification, only a single change in direction is shown to occur in each example. However, in actual practice, there could be multiple changes of direction for each parameter during a two dimensional hill climbing process. The number of changes can depend upon factors such as the original parameter values $t_1$ and $t_2$ and the optimized output power $t_3$.

The foregoing description and drawings of embodiments are merely illustrative of the principles of the invention. For example, alternatively, rather than impart a bias flip at delay times after $V_P$ peaks and valleys, bias flips may be imparted at lead times before $V_P$ peaks and valleys. Various modifications can be made to the embodiments by those skilled in the art without departing from the spirit and scope of the invention, which is defined in the appended claims.

The invention claimed is:

1. An impedance matching circuit, for use with a piezoelectric transducer that can produce an output voltage waveform in response to a mechanical input stimulus and with an energy storage circuit that can harvest energy from the output voltage waveform, wherein the piezoelectric transducer includes a parasitic capacitor, the impedance matching circuit comprising:
   an inductor configured to be coupled in parallel with the parasitic capacitor;
   a peak and valley detection circuit configured to detect output voltage waveform peaks and valleys;
   a first switch circuit configured to bias flip the output voltage waveform at at least one of an adjustable first time relative to a detected peak and at the adjustable first time relative to a detected valley; and
   a second switch circuit configured to couple the inductor to the energy storage circuit at an adjustable second time following each output voltage bias flip.

2. The circuit of claim 1, wherein the peak and valley detector includes a voltage peak and valley detector.

3. The circuit of claim 1, wherein the peak and valley circuit includes a differentiator circuit.

4. The circuit of claim 1, wherein the peak and valley circuit includes a differentiator circuit that includes a comparator and a capacitor coupled in series with resistor;
   wherein the capacitor is coupled to the output voltage waveform; and
   wherein the comparator is coupled to sense a voltage across the resistor.

5. The circuit of claim 1, wherein the peak and valley circuit includes a differentiator circuit that includes a comparator and a capacitor coupled in series with resistor and third and fourth diodes;
   wherein the capacitor is coupled to receive the output voltage waveform;
   wherein the comparator is coupled to sense a voltage across the resistor; and
   wherein the third and fourth diodes are coupled to provide opposite current paths parallel to the resistor.

6. The circuit of claim 1, further comprising:
   an energy monitoring circuit that includes a voltage detector configured to provide an indication of energy flow from the inductor to the energy storage circuit following each output voltage bias flip; and
   a maximum power point tracking (MPPT) circuit configured to adjust the first time and the second time based at least in part upon the indicated energy flow.

7. The circuit of claim 6, wherein the energy monitoring circuit further includes a counter configured to produce a count value indicative of a duration of a monitored time interval during which current flows from the inductor to the energy storage circuit.

8. The circuit of claim 6, wherein the voltage detector includes a comparator circuit coupled to provide an indication of whether current is flowing from the inductor to the energy storage circuit;
   wherein the energy monitoring circuit further includes a counter responsive to the provided indication, that is configured to produce a count value indicative of duration of a monitored time interval during which the provided indication indicates that current is flowing from the inductor to the energy storage circuit.

9. The circuit of claim 6, wherein the voltage detector is configured to provide an indication of whether current is flowing from the inductor to the energy storage circuit; and
   wherein the second switch is configured to decouple the inductor from the energy storage circuit in response to the provided indication indicating that current is not flowing from the inductor to the energy storage circuit.

10. The circuit of claim 6, wherein the MPPT circuit is configured to use a hill climbing process to adjust the first time and the second time based at least in part upon the indicated energy flow.

11. The circuit of claim 6, wherein the MPPT circuit is configured to search for a value for the first time and a value for the second time that maximize the indicated energy flow.

12. The circuit of claim 6, wherein the energy monitoring circuit further includes a counter configured to produce a count value indicative of a duration of a monitored time interval during which current flows from the inductor to the energy storage circuit; and
   wherein the MPPT circuit is configured to search for a value for the first time and a value for the second time that maximizes duration of a monitored time interval.

13. The circuit of claim 1 further including:
   a rectifier circuit coupled between the parasitic capacitance and the inductor and configured to rectify current provided to the inductor.

14. The circuit of claim 1, wherein bias flipping includes, at the adjustable first time relative to a detected peak and at the adjustable first time relative to a detected valley, coupling the inductor from parallel coupling with the capacitor, and following each coupling, after a time interval at least long enough for an occurrence of an output voltage waveform bias flip in response to the coupling, decoupling the inductor in parallel with the capacitor.

15. The circuit of claim 14 further including:
a first diode coupled in a first current path in parallel with the parasitic capacitance;
a second diode coupled in a second current path in parallel with the parasitic capacitance;
wherein the first diode coupled in the first current path and the second diode coupled in the second current path are coupled to have opposite current flow directions;
wherein the first switch circuit includes a first sub-switch circuit (S1, S4) configured to, at the adjustable first time relative to a detected peak, couple the inductor from parallel coupling with the capacitor via the first current path, and following each coupling, after a time interval at least long enough for an occurrence of an output voltage waveform bias flip in response to the coupling, decouple the inductor in parallel with the capacitor via the first current path; and
wherein the first switch circuit includes a first sub-switch circuit (S2, S3) configured to, at the adjustable first time relative to a detected valley, couple the inductor from parallel coupling with the capacitor via the second current path, and following each coupling, after a time interval at least long enough for an occurrence of an output voltage waveform bias flip in response to the coupling, decouple the inductor in parallel with the capacitor via the second current path.

16. An energy harvesting system comprising:
a piezoelectric transducer configured to produce an output voltage waveform in response to a mechanical input stimulus, wherein the piezoelectric transducer includes a parasitic capacitor;
an energy storage circuit that can harvest energy from the output voltage waveform;
an inductor configured to be coupled in parallel with the parasitic capacitor;
a peak and valley detection circuit configured to detect output voltage waveform peaks and valleys;
a first switch circuit configured to bias flip the output voltage waveform at an adjustable first time relative to a detected peak and at an adjustable first time relative to a detected valley; and
a second switch circuit configured to, at an adjustable second time following each output voltage bias flip, couple the inductor to the energy storage circuit.

17. The system of claim 16, wherein the energy storage circuit includes a battery.

18. The circuit of claim 6, wherein the voltage detector includes a comparator circuit coupled to provide an indication of difference between voltage at the inductor and voltage at the energy storage device.

19. The circuit of claim 16, further comprising:
an energy monitoring circuit that includes a voltage detector configured to provide an indication of energy flow from the inductor to the energy storage circuit following each output voltage bias flip; and
a maximum power point tracking (MPPT) circuit configured to adjust the first time and the second time based at least in part upon the indicated energy flow.

20. A method to capture energy from a piezoelectric transducer configured to produce an output voltage waveform in response to a mechanical input stimulus, wherein the piezoelectric transducer includes a parasitic capacitor, and wherein the parasitic capacitor is coupled in parallel with an inductor, the method comprising:
detecting output voltage waveform peaks and valleys;
controlling a first switch circuit to bias flip the output voltage waveform at times leading or lagging the detected output waveform peaks and at times leading or lagging the detected output waveform valleys; and
controlling a second switch circuit to couple an inductor to an energy storage device following each bias flip, wherein the inductor is coupled in parallel with the parasitic capacitor.

21. The method of claim 20, further comprising:
determining an indication of energy flow from the inductor to the energy storage device following each output bias flip; and
determining the leading or lagging times based at least in part upon the indicated energy flow.

* * * * *